(12) United States Patent
Hara et al.

(10) Patent No.: US 12,496,635 B2
(45) Date of Patent: Dec. 16, 2025

(54) SINTERED MATERIAL, SIZING DEVICE, AND METHOD FOR MANUFACTURING SINTERED MATERIAL

(71) Applicant: Sumitomo Electric Sintered Alloy, Ltd., Takahashi (JP)

(72) Inventors: Junpei Hara, Takahashi (JP); Seiji Sakamoto, Takahashi (JP)

(73) Assignee: SUMITOMO ELECTRIC SINTERED ALLOY, LTD., Takahashi (JP)

( * ) Notice: Subject to any disclaimer, the term of this patent is extended or adjusted under 35 U.S.C. 154(b) by 503 days.

(21) Appl. No.: 17/923,234

(22) PCT Filed: Jun. 9, 2020

(86) PCT No.: PCT/JP2020/022746
§ 371 (c)(1),
(2) Date: Nov. 4, 2022

(87) PCT Pub. No.: WO2021/250791
PCT Pub. Date: Dec. 16, 2021

(65) Prior Publication Data
US 2023/0071870 A1 Mar. 9, 2023

(51) Int. Cl.
B22F 5/06 (2006.01)
B22F 3/03 (2006.01)
B22F 3/24 (2006.01)
B33Y 80/00 (2015.01)

(52) U.S. Cl.
CPC ............... *B22F 5/06* (2013.01); *B22F 3/24* (2013.01); *B33Y 80/00* (2014.12)

(58) Field of Classification Search
CPC ............... B21H 5/022; B21J 5/12; B21K 1/30
See application file for complete search history.

(56) References Cited

FOREIGN PATENT DOCUMENTS

| | | | | |
|---|---|---|---|---|
| JP | H07252507 A | * | 10/1995 | ............... B22F 5/08 |
| JP | H9-220632 A | | 8/1997 | |
| JP | 10-305344 A | | 11/1998 | |
| JP | 11-77226 A | | 3/1999 | |
| JP | H1161203 A | * | 3/1999 | |
| JP | 2000140990 A | * | 5/2000 | |
| JP | 2004-156079 A | | 6/2004 | |

OTHER PUBLICATIONS

Oonishi Michinari et.al. [JPH10305344A] (Machine translation) (Year: 1998).*
English translate (JPH1161203A), retrieved date Jun. 2, 2025.*
English translate (JP2000140990A), retrieved date Jun. 2, 2025.*
English translate (JPH07252507A), retrieved date Jun. 2, 2025.*

* cited by examiner

*Primary Examiner* — Mohammed S. Alawadi
(74) *Attorney, Agent, or Firm* — XSENSUS LLP

(57) ABSTRACT

A cylindrical sintered material made of metal, in which one of an inner peripheral surface and an outer peripheral surface of the sintered material includes: a plurality of helical teeth arranged in parallel along a circumferential direction of the sintered material; and a sizing mark provided on at least a part of a tooth bottom surface, a tooth surface, and a tooth tip surface of each of the helical teeth, the helical tooth has a tooth profile error less than or equal to 6 μm, and the helical tooth has a tooth trace error less than or equal to 27 μm.

6 Claims, 6 Drawing Sheets

SINTERED MATERIAL, SIZING DEVICE, AND METHOD FOR MANUFACTURING SINTERED MATERIAL

CROSS-REFERENCE TO RELATED APPLICATION

The present application is based on PCT filing PCT/JP2020/022746, filed Jun. 9, 2020, the entire contents of which are incorporated herein by reference.

TECHNICAL FIELD

The present disclosure relates to a sintered material, a sizing device, and a method for manufacturing the sintered material.

BACKGROUND ART

For example, a sizing mold of PTL 1 is known as a sizing device that corrects dimensions of a sintered material in the process of manufacturing the sintered material. In the sizing mold of PTL 1, an internal helical gear is pressed by an upper punch, a lower punch, and a core in a through-hole of a die. The lower punch, the core, and the upper punch are opposite to each other in the through-hole of the die. The lower punch supports the other end of the internal helical gear. The lower punch is rotatably supported through a thrust bearing with respect to a cylinder actuator that raises and lowers the lower punch. The core is disposed inside the lower punch. Helical teeth that mesh with helical teeth of the internal helical gear is provided on an outer peripheral surface of the core. The core is rotatably connected to a lower ram that raises and lowers the core through a thrust bearing.

CITATION LIST

Patent Literature

PTL 1: Japanese Patent Laying-Open No. 2004-156079

SUMMARY OF INVENTION

A sintered material according to the present disclosure is a cylindrical sintered material made of metal, in which one of an inner peripheral surface and an outer peripheral surface of the sintered material includes:
a plurality of helical teeth arranged in parallel along a circumferential direction of the sintered material; and
a sizing mark provided on at least a part of a tooth bottom surface, a tooth surface, and a tooth tip surface of each of the helical teeth,
the helical tooth has a tooth profile error less than or equal to 6 san, and
the helical tooth has a tooth trace error less than or equal to 27 μm.
A sizing device according to the present disclosure is
a sizing device that corrects a dimension of a sintered material including a plurality of helical teeth, the sizing device includes:
a die provided with a through-hole in which the sintered material is disposed;
a first punch and a second punch that are disposed opposite to each other in the through-hole and press the sintered material;
a thrust bearing that rotatably supports the first punch; and
a first plate that abuts and stops the first punch at a predetermined position in a retreating direction of the first punch,
in which one of an inner peripheral surface of the through-hole of the die and an outer peripheral surface of the first punch has a first helical tooth that meshes with the helical tooth of the sintered material, and
the predetermined position is a position where a load acting on the thrust bearing is less than or equal to a load bearing capacity of the thrust bearing.
A method for manufacturing a sintered material according to the present disclosure, the method includes:
preparing the sintered material including a plurality of helical teeth;
disposing the sintered material in a cavity formed by a die having a through-hole and a first punch disposed in the through-hole; and
pressing the sintered material in the cavity by the first punch and a second punch disposed opposite to the first punch to correct a dimension of the sintered material,
the first punch is rotatably supported by a thrust bearing,
in which one of an inner peripheral surface of the through-hole of the die and an outer peripheral surface of the first punch includes a first helical tooth that meshes with the helical tooth of the sintered material, and
in the correcting the dimension of the sintered material, the first punch is abutted and stopped at a predetermined position in a retreating direction of the first punch.

DESCRIPTION OF EMBODIMENT

Figure 1:
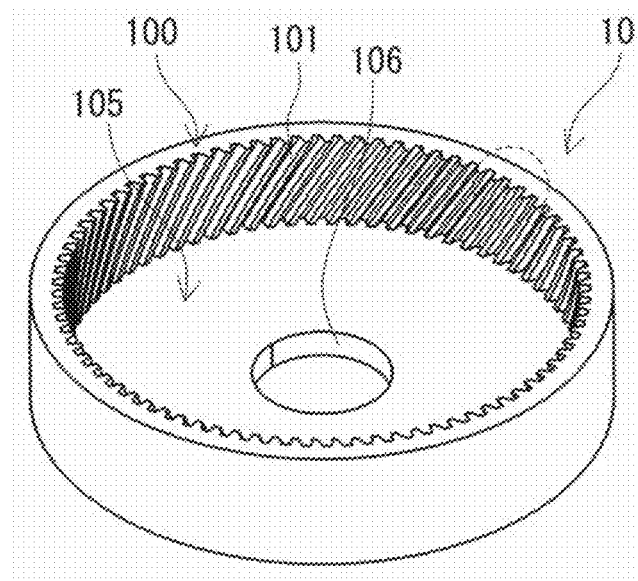
FIG. 1 is a perspective view illustrating an outline of a sintered material according to a first embodiment.

Problem to be Solved by the Present Disclosure

In the above-described sizing device, because pressing force of the upper punch acts on the thrust bearing through the lower punch and the core, pressing force exceeding a load bearing capacity of the thrust bearing cannot be applied to the sintered material. Consequently, the high pressing force is not applied to the sintered material, and it is difficult to obtain the sintered material with high dimensional accuracy.

Accordingly, an object of the present disclosure is to provide a sintered material having excellent dimensional accuracy. Another object of the present disclosure is to provide a sizing device capable of improving the dimensional accuracy of the sintered material. Furthermore, still another object of the present disclosure is to provide a method for manufacturing the sintered material capable of manufacturing the sintered material having the excellent dimensional accuracy.

Effect of the Present Disclosure

The sintered material according to the present disclosure has the excellent dimensional accuracy.

The sizing device according to the present disclosure can improve the dimensional accuracy of the sintered material.

The method for manufacturing the sintered material according to the present disclosure can manufacture the sintered material having the excellent dimensional accuracy.

DESCRIPTION OF EMBODIMENTS OF THE PRESENT DISCLOSURE

First, embodiments of the present disclosure will be listed and described.

(1) A sintered material according to one aspect of the present disclosure is
a cylindrical sintered material made of metal, in which one of an inner peripheral surface and an outer peripheral surface of the sintered material includes:
a plurality of helical teeth arranged in parallel along a circumferential direction of the sintered material; and
a sizing mark provided on at least a part of a tooth bottom surface, a tooth surface, and a tooth tip surface of each of the helical teeth,
the helical tooth has a tooth profile error less than or equal to 6 μm, and
the helical tooth has a tooth trace error less than or equal to 27 μm.

In the above configuration, the tooth profile error and the tooth trace error of the helical tooth are small, and the dimensional accuracy is excellent.

(2) A sizing device according to one aspect of the present disclosure is
a sizing device that corrects a dimension of a sintered material including a plurality of helical teeth, the sizing device includes:
a die provided with a through-hole in which the sintered material is disposed;
a first punch and a second punch that are disposed opposite to each other in the through-hole and press the sintered material;
a thrust bearing that rotatably supports the first punch; and
a first plate that abuts and stops the first punch at a predetermined position in a retreating direction of the first punch,
in which one of an inner peripheral surface of the through-hole of the die and an outer peripheral surface of the first punch has a first helical tooth that meshes with the helical tooth of the sintered material, and
the predetermined position is a position where a load acting on the thrust bearing is less than or equal to a load bearing capacity of the thrust bearing.

With the above configuration, the dimensional accuracy of the sintered material can be enhanced. In particular, the above configuration can sufficiently reduce the tooth profile error and the tooth trace error of the plurality of helical teeth in the sintered material. This is because the pressing force of the second punch acting on the thrust bearing through the sintered material and the first punch can be transmitted to the first plate by including the first plate that abuts and stops the first punch in contact with the first punch at the predetermined position. Accordingly, the above configuration can reduce and thus eliminate the load acting on the thrust bearing. Consequently, the above configuration can apply the high pressing force to the sintered material.

(3) As one aspect of the sizing device,
the first punch includes a first inner punch and a first outer punch disposed inside and outside the through-hole,
the thrust bearing rotatably supports one of the first inner punch and the first outer punch,
the first plate abuts and stops one of the first inner punch and the first outer punch supported by the thrust bearing at a predetermined position in a retreating direction of the punch,
the first helical tooth is provided on one of an inner peripheral surface of the through-hole of the die and an outer peripheral surface of the first inner punch, and
one of an inner peripheral surface and an outer peripheral surface of the first outer punch includes a second helical tooth that meshes with the first helical tooth.

With the above configuration, the dimensional accuracy of the sintered material can be further enhanced. This is because the first punch includes the first inner punch and the second inner punch, so that it is easy to apply densely and uniformly the pressing force to the sintered material.

(4) As one aspect of the sizing device of (3),
the sizing device further includes:
an inner holder that holds the first inner punch;
an inner actuator that lifts and lowers the inner holder,
an outer holder that holds the first outer punch,
an outer actuator that lifts and lowers the outer holder, and
a second plate that abuts and stops the punch, which is not supported by the thrust bearing in the first inner punch and the first outer punch, at a predetermined position in a retreating direction of the punch,
in which the thrust bearing includes a first thrust bearing and a second thrust bearing disposed opposite to each other along an axial direction of the inner holder, and
the inner holder includes:
a body mounted on insides of the first thrust bearing and the second thrust bearing;
a flange interposed between the first thrust bearing and the second thrust bearing; and
an overhang provided on a second punch side with respect to the flange and abutted on and stopped at the first plate.

With the above configuration, the dimensional accuracy of the sintered material can be further enhanced. In the above configuration, because the second plate is provided, when the first inner punch supported by the thrust bearing is abutted on and stopped at the first plate, the first outer punch not supported by the thrust bearing can be abutted and stopped. Consequently, in the above configuration, the sintered material can be uniformly pressed by the first inner punch supported by the thrust bearing and the first outer punch not supported by the thrust bearing.

(5) As one aspect of the sizing device of (4),
the sintered material includes an inner peripheral surface provided with the plurality of helical teeth, an outer peripheral surface of the first inner punch includes the first helical tooth, and an inner peripheral surface of the first outer punch includes the second helical tooth.

With the above configuration, the dimensional accuracy of the sintered material in which the plurality of helical teeth is provided on the inner peripheral surface can be enhanced.

(6) As one aspect of the sizing device of (3), the sizing device further includes:

an inner holder that holds the first inner punch;

an inner actuator that lifts and lowers the inner holder;

an outer holder that holds the first outer punch;

an outer actuator that lifts and lowers the outer holder; and a second plate that abuts and stops the punch, which is not supported by the thrust bearing in the first inner punch and the first outer punch, at a predetermined position in a retreating direction of the punch, in which the thrust bearing includes a first thrust bearing and a second thrust bearing disposed opposite to each other along an axial direction of the outer holder, and the outer holder includes:

a body mounted on insides of the first thrust bearing and the second thrust bearing;

a flange interposed between the first thrust bearing and the second thrust bearing; and an overhang provided on a second punch side with respect to the flange and abutted on and stopped at the first plate.

With the above configuration, the dimensional accuracy of the sintered material can be further enhanced. In the above configuration, because the second plate is provided, when the first outer punch supported by the thrust bearing is abutted on and stopped at the first plate, the first inner punch not supported by the thrust bearing can be abutted and stopped. Consequently, in the above configuration, the sintered material can be uniformly pressed by the first outer punch supported by the thrust bearing and the first inner punch not supported by the thrust bearing.

(7) As one aspect of the sizing device of (6), the sintered material includes an outer peripheral surface provided with the plurality of helical teeth, an inner peripheral surface of the through-hole of the die includes the first helical tooth, and an outer peripheral surface of the first outer punch includes the second helical tooth.

With the above configuration, the dimensional accuracy of the sintered material in which the plurality of helical teeth is provided on the outer peripheral surface can be enhanced.

(8) A method for manufacturing a sintered material according to one aspect of the present disclosure, the method includes:

preparing the sintered material including a plurality of helical teeth;

disposing the sintered material in a cavity formed by a die having a through-hole and a first punch disposed in the through-hole; and pressing the sintered material in the cavity by the first punch and a second punch disposed opposite to the first punch to correct a dimension of the sintered material, the first punch is rotatably supported by a thrust bearing.

in which one of an inner peripheral surface of the through-hole of the die and an outer peripheral surface of the first punch includes a first helical tooth that meshes with the helical tooth of the sintered material, and in the correcting the dimension of the sintered material, the first punch is abutted and stopped at a predetermined position in a retreating direction of the first punch.

With the above configuration, the sintered material having the excellent dimensional accuracy can be manufactured. In particular, the sintered material in which the tooth profile error and the tooth trace error of the plurality of helical teeth satisfy the above-described ranges can be manufactured. This is because the pressing force of the second punch hardly acts on the thrust bearing through the sintered material and the first punch by abutting and stopping the first punch at a predetermined position in correcting the dimension of the sintered material, and thus, the pressing force can be prevented from acting at all. For this reason, the load acting on the thrust bearing can be reduced and thus eliminated. Consequently, the above configuration can apply the high pressing force to the sintered material.

DETAILS OF EMBODIMENT OF THE PRESENT DISCLOSURE

Details of embodiments of the present disclosure will be described below. In the drawings, the same reference numerals indicate the same names.

First Embodiment

[Sintered Material]

Figure 2:
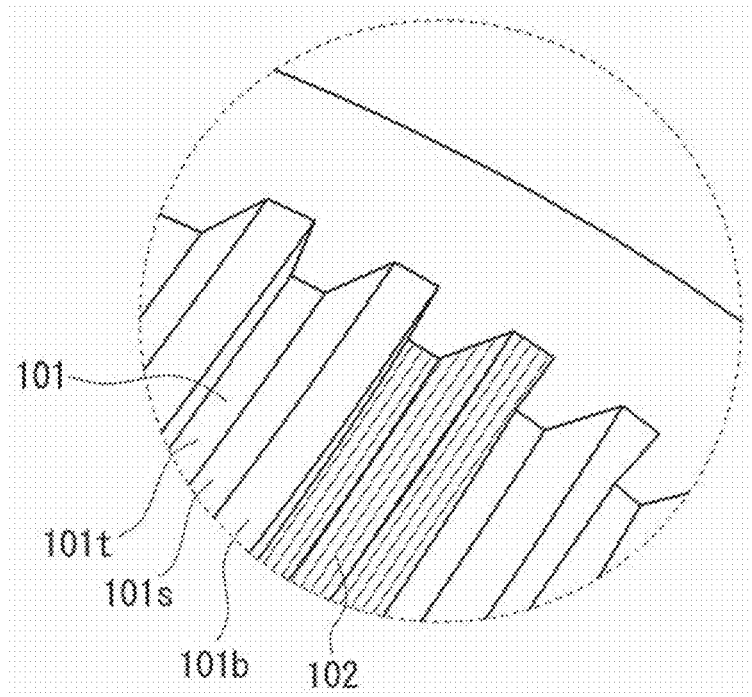
FIG. 2 is an enlarged view schematically illustrating an outline of a peripheral surface of the sintered material according to the first embodiment.

With reference to FIGS. 1 and 2, a sintered material 10 according to a first embodiment will be described. As illustrated in FIG. 1, sintered material 10 of the first embodiment is formed in a cylindrical shape. One of the features of sintered material 10 in the first embodiment is that a peripheral surface of sintered material 10 has a plurality of helical teeth 101 and a plurality of sizing marks 102 (FIG. 2), and that a tooth profile error and a tooth trace error of helical teeth 101 are small. Details of each constitution will be described below. FIG. 2 is an enlarged view illustrating a broken line circle in FIG. 1.

Sintered material 10 is formed by bonding a plurality of metal particles to each other. Typical example of the metal include an iron-based material. The iron-based material refers to pure iron or an iron alloy. The iron-based material can be suitably used for the applications described later.

Examples of the iron alloy include those containing at least one additive element selected from a group consisting of Cu (copper), C (carbon), Ni (nickel), Mo (molybdenum), Mn (manganese), and Cr (chromium) and the balance consisting of Fe (iron) and impurities. A content of Cu, Ni, Mo, Mn, and Cr is greater than 0 mass % and less than or equal to 10.0 mass % in total, further less than or equal to 5.0 mass %, and particularly greater than or equal to 0.1 mass % and less than or equal to 2.0 mass % when entire sintered material 10 is 100 mass %. The content of C is greater than 0 mass % and less than or equal to 2.0 mass %, and further greater than or equal to 0.1 mass % and less than or equal to 1.0 mass % when entire sintered material 10 is 100 mass %.

Specific examples of the iron alloy include stainless steel, an Fe—C-based alloy, an Fe—Cu—Ni—Mo-based alloy, an Fe—Ni—Mo—Mn-based alloy, an Fe—Cu-based alloy, an Fe—Cu—C-based alloy, an Fe—Cu—Mo-based alloy, an Fe—Ni—Mo—Cu-based alloy, an Fe—Ni—Cu-based alloy, an Fe—Ni—Mo—C-based alloy, an Fe—Ni—Cr-based alloy, an Fe—Ni—Mo—Cr-based alloy, an Fe—Cr-based alloy, an Fe—Mo—Cr-based alloy, an Fe—Mo—Cr-based alloy, an Fe—Cr—C-based alloy, an Fe—Ni—C-based alloy, and an Fe—Mo—Mn—Cr—C-based alloy.

In addition, examples of the metal constituting sintered material 10 include copper, a copper alloy, titanium, a titanium alloy, aluminum, an aluminum alloy, magnesium, a magnesium alloy, and pure tungsten.

The composition of sintered material 10 can be checked by component analysis using inductively coupled plasma optical emission spectrometry (ICP-OES) or the like.

Sintered material 10 has the cylindrical shape. In the first embodiment, sintered material 10 includes a cylindrical portion 100 and a disk portion 105 provided on one end side in the axial direction of cylindrical portion 100. One of an inner peripheral surface and an outer peripheral surface of cylindrical portion 100 includes the plurality of helical teeth 101 and the plurality of sizing marks 102 (FIG. 2).

The plurality of helical teeth 101 are arranged in parallel along the circumferential direction (FIG. 1). Each helical tooth 101 is a tooth inclined at a predetermined helix angle with respect to the axis of sintered material 10. As illustrated in FIG. 2, each helical tooth mainly includes a tooth bottom surface 101*b*, a tooth surface 101*s*, and a tooth tip surface 101*t*. Tooth bottom surface 101*b* is a surface constituting a space provided between adjacent helical teeth 101, namely, a bottom of a tooth groove. Tooth tip surface 101*t* is a surface constituting a region on the tip side of helical tooth 101. Tooth surface 101*s* is a surface between tooth bottom surface 101*b* and tooth tip surface 101*t*.

Sizing mark 102 is provided on at least a part of tooth bottom surface 101*b*, tooth surface 101*s*, and tooth tip surface 101*t* of helical tooth 101. Sizing mark 102 refers to a glossy surface in which a plurality of stripes along the inclination of helical tooth 101. The glossy surface is a mirror surface. In FIG. 2, for convenience of description, the stripe is schematically indicated by a thin line.

In the first embodiment, the inner peripheral surface of sintered material 10 includes the plurality of helical teeth 101 and the plurality of sizing marks 102. That is, the shape of the inner peripheral surface of sintered material 10 is a helical gear shape. On the other hand, the outer peripheral surface of sintered material 10 has a cylindrical shape.

As illustrated in FIG. 1, a through-hole 106 is provided at a center of disc portion 105. The inner peripheral shape of through-hole 106 is a cylindrical shape in the first embodiment. The first surface and the second surface of disc portion 105 are surfaces constituting the front and back surfaces of disc portion 105. The first surface and the second surface are flat surfaces in the first embodiment. The first surface and the second surface of disc portion 105 may have a stepped surface.

The tooth profile error of helical tooth 101 is less than or equal to 6 μm. The tooth trace error of helical tooth 101 is less than or equal to 27 μm. Sintered material 10 having the tooth profile error less than or equal to 6 μm and the tooth trace error less than or equal to 27 μm is excellent in dimensional accuracy. The tooth profile error can further be less than or equal to 5 μm, and particularly less than or equal to 4 μm. The tooth trace error can be further less than or equal to 25 μm, and particularly less than or equal to 20 μm.

Although the tooth profile error and the tooth trace error will be described in detail later, the tooth profile error and the tooth trace error of the left and right tooth surfaces 101*s* of at least eight helical teeth 101 are obtained, and the tooth profile error and the tooth trace error are the maximum tooth profile error and the maximum tooth trace error in all the obtained tooth profile errors and all the tooth trace errors. Each helical tooth 101 is helical tooth 101 at substantially equal intervals in the circumferential direction. The tooth profile error and the tooth trace error of each helical tooth 101 are obtained according to "JIS B 1702-1 (2016) cylindrical gears-precision grades—part 1: definitions and allowable values of errors in gear teeth surface". The tooth profile error and the tooth trace error of each helical tooth 101 correspond to "all tooth type error" and "all tooth trace error" of JIS described above.

For example, relative density of sintered material 10 is greater than or equal to 87% and less than or equal to 99.5%. For example, the relative density is preferably greater than or equal to 90%, further preferably greater than or equal to 92%, and particularly preferably greater than or equal to 95%. For example, the relative density may be greater than or equal to 97, greater than or equal to 98%, or greater than or equal to 99%. The relative density of sintered material 10 is obtained by "(apparent density of sintered material/true density of sintered material)×100". The apparent density of sintered material 10 is determined according to an Archimedes method. Specifically, the apparent density of sintered material 10 is obtained by "{dry weight of sintered material/(dry weight of sintered material−weight of oil immersion material of sintered material in water)}×density of water". The weight in water of the oil-immersed material of sintered material 10 is the weight of a member obtained by immersing the sintered material immersed in oil and impregnated with oil in water.

Effect

Sintered material 10 of the first embodiment has the small tooth profile error and the tooth trace error of helical tooth 101, and is excellent in dimensional accuracy.

[Sizing Device]

Mainly with reference to FIG. 3A, a sizing device 1 of the first embodiment will be described. Sizing device 1 corrects dimensions of sintered material 11 including a plurality of helical teeth 111. Sizing device 1 includes a die 2, a first punch 31 and a second punch 32, and a thrust bearing 50. Die 2 includes a through-hole 20 in which sintered material 11 is disposed. First punch 31 and second punch 32 are disposed to be opposite to each other in through-hole 20 and press sintered material 11. Thrust bearing 50 rotatably supports first punch 31. Either the inner peripheral surface of through-hole 20 of die 2 or the outer peripheral surface of first punch 31 includes first helical teeth 311*t* that mesh with helical teeth 111 of sintered material 11. One of the features of sizing device 1 of the first embodiment is that sizing device 1 includes the first plate 71 that abuts and stops first punch 31 at a predetermined position in the retreating direction of the first punch 31. Details of each constitution will be described below. In the following description, the side of first punch 31 is referred to as a lower side, and the side of second punch 32 is referred to as an upper side. Movement of first punch 31 and second punch 32 in the direction of approaching each other is referred to as forward movement, and movement of first punch 31 and second punch 32 in the direction of separating from each other is referred to as backward movement. The direction in which first punch 31 and second punch 32 approach each other is a direction in which sintered material 11 is pressed. Upward movement of first punch 31 and downward movement of second punch 32 are defined as forward movement, and downward movement of first punch 31 and upward movement of second punch 32 are defined as backward movement.

[Die]

Die 2 includes through-hole 20. Through-hole 20 includes an inner peripheral surface in sliding contact with the outer peripheral surface of sintered material 11. The inner peripheral surface of through-hole 20 has a shape corresponding to the outer peripheral surface of sintered material 11. The shape of the inner peripheral surface of through-hole 20 will be described later. Die 2 is fixed to a die plate. The die plate is not illustrated. Due to this fixing, die 2 itself does not rotate or is not lifted and lowered. Core rod 30, first punch 31, and second punch 32 are inserted into through-hole 20.

[Core Rod]

Core rod 30 includes an outer peripheral surface in sliding contact with the inner peripheral surface of a through-hole 116 of sintered material 11. Through-hole 116 of sintered material 11 constitutes through-hole 106 of sintered material 11 after the sizing of sintered material 10 (FIG. 1). The shape of core rod 30 corresponds to the inner peripheral shape of through-hole 116. In the first embodiment, core rod 30 has a cylindrical shape. Core rod 30 is fixed to a core plate 70. Core plate 70 may be liftably supported by an actuator such that core rod 30 can be independently driven in the vertical direction with respect to die 2. The actuator is not illustrated. Alternatively, core plate 70 may be fixed so as not to be driven independently with respect to die 2 such that the surfaces of core rod 30 and die 2 on the side of second punch 32 are flush with each other.

[First Punch and Second Punch]

First punch 31 and second punch 32 press sintered material 11 in through-hole 20. Sintered material 10 in FIG. 1 is produced by correcting the dimension of sintered material 11 by this pressing. When sintered material 11 is pressed, first punch 31 is retracted by the pressing force of second punch 32. First punch 31 and second punch 32 are disposed to be opposite to each other in through-hole 20. In the first embodiment, first punch 31 includes two independent members of a first inner punch 311 and a first outer punch 312 that are disposed inside and outside through-hole 20. Second punch 32 includes one member. First inner punch 311 and first outer punch 312 can be independently driven in the vertical direction with respect to die 2 and core rod 30 by an inner actuator 61 and an outer actuator 62 described later. Although not illustrated, second punch 32 can be driven independently in the vertical direction with respect to die 2 and core rod 30 by the second actuator.

First inner punch 311 is inserted into sintered material 11 to press the inner peripheral surface of sintered material 11 and the first surface of disk portion 115. The first surface of disk portion 115 is a lower surface and is a surface located on the lower side of the paper surface in FIG. 3A. First outer punch 312 presses the first end face of cylindrical portion 110 of sintered material 11. The first end face of cylindrical portion 110 is a lower end face and is an end face located on the lower side of the paper surface in FIG. 3A. When the first surface of disk portion 115 and the first end surface of cylindrical portion 110 are pressed to connect the dimension of sintered material 11, disk portion 115 constitutes disk portion 105 in FIG. 1, and cylindrical portion 110 constitutes cylindrical portion 100 in FIG. 1. First inner punch 311 and first outer punch 312 are inserted between the inner peripheral surface of through-hole 20 and core rod 30. First inner punch 311 and first outer punch 312 have a cylindrical shape. An insertion hole through which core rod 30 is inserted is formed at the center of first inner punch 311. The inner peripheral shape of the insertion hole corresponds to the shape of core rod 30. In the first embodiment, the inner peripheral shape of the insertion hole has a cylindrical shape.

The upper end surface of first inner punch 311 has a shape corresponding to the first surface of disk portion 115 of sintered material 11. In the first embodiment, the upper end surface of first inner punch 311 is a flat surface. The planar shape of the upper end surface of first inner punch 311 has a shape corresponding to the planar shape of the first surface of disk portion 115. In the first embodiment, the planar shape of the upper end surface of first inner punch 311 has an annular shape. The upper end surface of first outer punch 312 has a shape corresponding to the first end surface of cylindrical portion 110 of sintered material 11. In the first embodiment, the upper end surface of first inner punch 311 is a flat surface. The planar shape of the upper end surface of first outer punch 312 has a shape corresponding to the planar shape of the first end surface of cylindrical portion 110. In the first embodiment, the planar shape of the upper end surface of first outer punch 312 has an annular shape.

The outer peripheral surface of first inner punch 311 has a shape corresponding to the inner peripheral surface of sintered material 11. The inner peripheral surface of first outer punch 312 has a shape corresponding to the outer peripheral surface of first inner punch 311. The outer peripheral surface of first outer punch 312 has a shape corresponding to the inner peripheral surface of die 2. The shapes of the outer peripheral surface of first inner punch 311 and the inner peripheral surface and the outer peripheral surface of first outer punch 312 will be described later together with the shape of the inner peripheral surface of die 2 and the shape of the outer peripheral surface of second punch 32.

Second punch 32 presses the second end surface of cylindrical portion 110 and the second surface of disk portion 115 of sintered material 11. The second end surface of cylindrical portion 110 is an upper end surface, and is an end surface located on the upper side of the paper surface in FIG. 3A. The second surface of disk portion 115 is an upper surface, and is a surface located on the upper side of the paper surface in FIG. 3A. The second punch 32 has a cylindrical shape. An insertion hole 32h through which core rod 30 is inserted is formed at the center of second punch 32. Similarly to the insertion hole of first inner punch 311, the inner peripheral shape of insertion hole 32h is a shape corresponding to the outer shape of core rod 30. That is, in the first embodiment, the inner peripheral shape of insertion hole 32h has a cylindrical shape.

The lower end surface of second punch 32 has a shape corresponding to the second surface of disk portion 115 of sintered material 11. In the first embodiment, the lower end surface of second punch 32 is a flat surface. The planar shape of the lower end surface of second punch 32 has a shape corresponding to the planar shape of the second surface of disk portion 115. In the first embodiment, the planar shape of the lower end surface of second punch 32 has an annular shape. The outer peripheral surface of second punch 32 has a shape corresponding to the inner peripheral surface of die 2.

[Shapes of Inner Peripheral Surface and Outer Peripheral Surface of Each Member]

The inner peripheral surface of through-hole 20, the outer peripheral surface of first inner punch 311, the inner peripheral surface and outer peripheral surface of the first outer punch 312, and the outer peripheral surface of second punch 32 can be appropriately selected according to the shapes of the inner peripheral surface and the outer peripheral surface of sintered material 11 to be sized. The case of the first embodiment, in which the inner peripheral surface of sintered material 11 includes a plurality of helical teeth 111 and the outer peripheral surface of sintered material 11 is formed of a cylindrical surface, will be described. Unlike the first embodiment, an embodiment, in which the inner peripheral surface of sintered material 1*l* is formed of the cylindrical surface and the outer peripheral surface has a plurality of helical teeth 111, will be described in a second embodiment described later. When the dimensions of sintered material 11 are corrected, each helical tooth 111 constitutes each helical tooth 101 (FIG. 1).

Case of First Embodiment

The inner peripheral surface of through-hole 20 has a cylindrical shape corresponding to the outer peripheral surface of sintered material 11. The outer peripheral surface of first inner punch 311 includes the plurality of first helical teeth 311*t* that mesh with the plurality of helical teeth 111 of sintered material 11. The shape of the inner peripheral surface of first outer punch 312 includes the plurality of second helical teeth 312*t* that mesh with the plurality of first helical teeth 311*t* of first inner punch 311. The shape of the outer peripheral surface of first outer punch 312 and the shape of the outer peripheral surface of second punch 32 are cylindrical shapes corresponding to the inner peripheral surface of through-hole 20. That is, the inner peripheral surface of through-hole 20, the outer peripheral surface of first outer punch 312, and the outer peripheral surface of second punch 32 are all cylindrical surfaces.

[Support Form]

One of first inner punch 311 and first outer punch 312 is rotatably supported by thrust bearing 50, and the other punch is supported so as not to rotate. The support form of first inner punch 311 and first outer punch 312 can be appropriately selected depending on whether the surface of sintered material 11 to be sized on which the helical teeth 111 are formed is the inner peripheral surface or the outer peripheral surface and whether sintered material 11 is rotated in the process of housing and discharging sintered material 11 into through-hole 20. Specific examples include the case of <1> the first embodiment, the case of <2> the modification of the first embodiment, and the case of <3> the second embodiment.

<1> Helical teeth 111 are formed on the inner peripheral surface of sintered material 11, and the sintered material is not rotated in the process of storing and discharging sintered material 11.

<2> Helical tooth is formed on the inner peripheral surface of the sintered material, and the sintered material is rotated in the process of storing and discharging the sintered material.

<3> Helical teeth 111 are formed on the outer peripheral surface of sintered material 11, and the sintered material is rotated in the process of storing and discharging sintered material 11.

Case of First Embodiment <1>

Figure 3A:
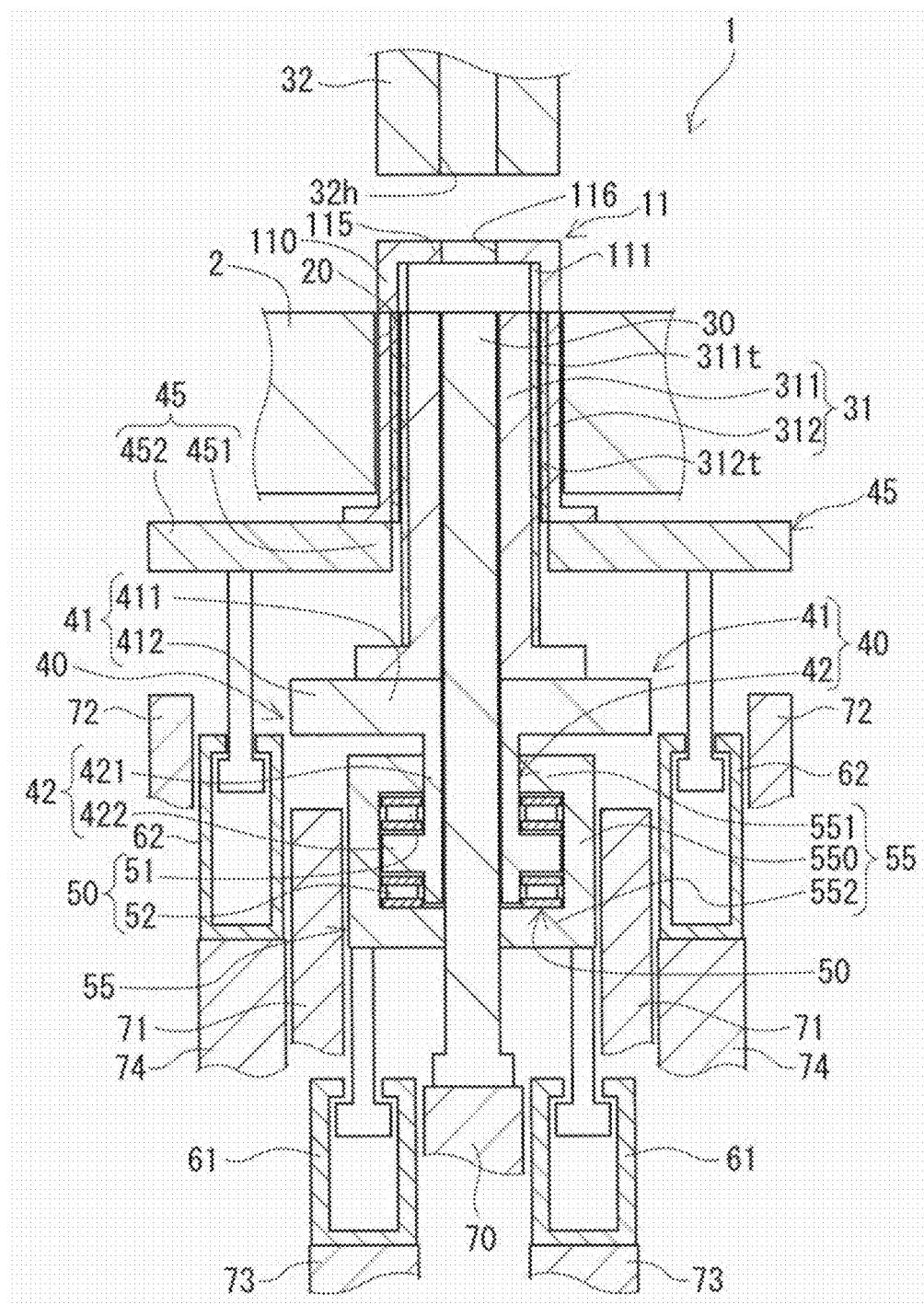
FIG. 3A is a sectional view schematically illustrating an outline of a state before a sintered material is accommodated in a cavity in the sizing device of the first embodiment.

As illustrated in FIG. 3A, first inner punch 311 is rotatably supported by thrust bearing 50 through an inner holder 40 described later. First outer punch 312 is held by an outer holder 45 described later so as not to rotate.

Case of Modification <2>

Although not illustrated, first inner punch 311 is held by inner holder 40 so as not to rotate. First outer punch 312 is rotatably supported by thrust bearing 50 through outer holder 45.

The case of the second embodiment <3> is the same as the case of the modification <2>, although it will be described later.

[Inner Holder and Outer Holder]

First inner punch 311 is held by inner holder 40. First outer punch 312 is held by outer holder 45. Inner holder 40 and outer holder 45 can be lifted and lowered by inner actuator 61 and outer actuator 62, respectively. For this reason, first inner punch 311 and first outer punch 312 can be independently driven in the vertical direction with respect to die 2 and core rod 30.

In the first embodiment, inner holder 40 is attached to thrust bearing 50 accommodated in a bearing case 55. Consequently, first inner punch 311 is rotatably supported by thrust bearing 50 through inner holder 40. Inner holder 40 has a cylindrical shape. An insertion hole through which core rod 30 is inserted is formed at the center of inner holder 40. Similarly to the insertion hole of the first inner punch 311, the inner peripheral shape of the insertion hole is a shape corresponding to the outer shape of core rod 30. That is, in the first embodiment, the inner peripheral shape of the insertion hole has a cylindrical shape.

In the first embodiment, inner holder 40 includes a first inner holder 41 and a second inner holder 42. First inner holder 41 is provided on the side of first inner punch 311. Second inner holder 42 is provided on the side opposite to the side of first inner punch 311 of first inner holder 41. First inner holder 41 and second inner holder 42 may be formed in series, or formed independently and connected to each other.

First inner holder 41 includes a first body 411 and an overhang 412. First body 411 is provided on the side of core rod 30 and holds first inner punch 311.

Overhang 412 is abutted on and stopped at first plate 71 described later at a predetermined position in the retreating direction during the sizing of sintered material 11. When being located at a position on the advancing direction side with respect to a predetermined position in the retreating direction, overhang 412 is not abutted on and stopped at first plate 71. Overhang 412 is provided on the outer peripheral side of first body 411.

Second inner holder 42 is accommodated in bearing case 55. Second inner holder 42 includes a second body 421 and a flange 422. Second body 421 is provided on the side of core rod 30, and is mounted inside a first thrust bearing 51 and a second thrust bearing 52 described later. Flange 422 is formed in an annular shape protruding from the outer peripheral surface of second body 421 toward the outer peripheral side. Flange 422 is interposed between first thrust bearing 51 and second thrust bearing 52.

In the first embodiment, outer holder 45 is not attached to thrust bearing 50. Consequently, first outer punch 312 does not rotate. Outer holder 45 has a cylindrical shape. An insertion hole through which first inner punch 311 is inserted is formed at the center of outer holder 45. The inner peripheral shape of the insertion hole is a shape corresponding to the outer shape of first inner punch 311. That is, in the first embodiment, the inner peripheral shape of the insertion hole has a cylindrical shape.

Similarly to first inner holder 41, outer holder 45 includes a body 451 and an overhang 452. Body 451 holds first outer punch 312. Overhang 452 is abutted on and stopped at a second plate 72 described later at a predetermined position in the retreating direction during the sizing of sintered material 11. When being located at a position on the advancing direction side with respect to a predetermined position in the retreating direction, overhang 452 is not abutted on and stopped at second plate 72. The abutment and stop of overhang 452 of outer holder 45 on and at second plate 72 are performed substantially simultaneously with the abutment and stop of overhang 412 of inner holder 40 on and at first plate 71. The abutment and stop of overhang 452 of outer holder 45 on and at second plate 72 may not be performed at the same time as the abutment and stop of overhang 412 of inner holder 40 on and at first plate 71. The abutment and stop of overhang 452 of outer holder 45 on and at the second plate 72 may be earlier or later than the abutment of and stop of overhang 412 of inner holder 40 on and at first plate 71. Overhang 452 is provided on the outer peripheral side of the body 451.

[Thrust Bearing]

Thrust bearing 50 rotatably supports one of first inner punch 311 and first outer punch 312. In the first embodiment, thrust bearing 50 rotatably supports first inner punch 311. In the first embodiment, thrust bearing 50 includes two bearings of a first thrust bearing 51 and a second thrust bearing 52. Both thrust bearings 51, 52 are accommodated in bearing case 55. Both thrust bearings 51, 52 are mounted on the outer periphery of second body 421 in the inner holder 40 so as to sandwich flange 422 of inner holder 40 from both sides in the axial direction of second body 421. A thrust roller bearing can be used for both thrust bearings 51, 52.

[Bearing Case]

Bearing case 55 accommodates first thrust bearing 51 and second thrust bearing 52 therein. Bearing case 55 includes an outer peripheral wall 550, a first annular portion 551, and a second annular portion 552. Outer peripheral wall 550 surrounds the outer peripheries of first thrust bearing 51 and second thrust bearing 52.

First annular portion 551 is disposed above first thrust bearing 51, and sandwiches first thrust bearing 51 between first annular portion 551 and flange 422. First annular portion 551 is formed in an annular shape. An insertion hole through which second body 421 of second inner holder 42 is inserted is provided at the center of first annular portion 551. First annular portion 551 is provided so as to protrude from the upper end of outer peripheral wall 550 toward the inner peripheral side.

Second annular portion 552 is disposed below second thrust bearing 52, and sandwiches second thrust bearing 52 between second annular portion 552 and flange 422. Second annular portion 552 is formed in an annular shape. An insertion hole through which core rod 30 is inserted is formed at the center of second annular portion 552. Second annular portion 552 is provided so as to protrude from the lower end of outer peripheral wall 550 toward the inner peripheral side.

[Inner Actuator and Outer Actuator]

Inner actuator 61 lifts and lowers first inner punch 311, namely, moves forward and backward first inner punch 311. Inner actuator 61 is connected to bearing case 55 in the first embodiment. By lifting and lowering bearing case 55, first helical tooth 311t of first inner punch 311 applies upward force or downward force to second helical tooth 312t of first outer punch 312. First outer punch 312 does not rotate, and first inner punch 311 is rotatable. Accordingly, inner holder 40 and first inner punch 311 lift and lower while rotating with respect to first outer punch 312 by the upward force or the downward force. Inner actuator 61 is fixed to inner plate 73 that does not lift and lower.

Outer actuator 62 lifts and lowers first outer punch 312, namely, moves forward and backward first outer punch 312. Outer actuator 62 is connected to outer holder 45 in the first embodiment. Second helical tooth 312t of first outer punch 312 applies the upward force or the downward force to first helical tooth 311t of first inner punch 311 by raising and lowering of outer holder 45. When inner holder 40 and first inner punch 311 rotate with respect to first outer punch 312 by the upward force or the downward force, first outer punch 312 lifts and lowers without rotating. Outer actuator 62 is fixed to outer plate 74 that does not lift and lower.

A hydraulic system can be cited as the driving systems of inner actuator 61 and outer actuator 62. For example, a hydraulic cylinder can be used as inner actuator 61 and outer actuator 62.

[First Plate and Second Plate]

First plate 71 stops the punch supported by thrust bearing 50 at a predetermined position in the retreating direction of one of first inner punch 311 and first outer punch 312. Second plate 72 stops the punch at a predetermined position in the retreating direction of one of first inner punch 311 and first outer punch 312 that is not supported by thrust bearing 50.

The predetermined position in the retreating direction of the punch supported by thrust bearing 50 is a position satisfying both the following positions (1) and (2).

The position (1) is a position closer to second punch 32 than the position of the punch where the maximum pressing force acts on sintered material 11. The punch on which the maximum pressing force acts is first inner punch 311 in the first embodiment. In the second embodiment described later, the punch on which the maximum pressing force acts is first outer punch 312.

The position (2) is a position where a load acting on thrust bearing 50 by second punch 32 falls within the range of the load bearing capacity of thrust bearing 50. In particular, the position (2) is a position where the load acting on second thrust bearing 52 falls within the range of the load bearing capacity of second thrust bearing 52.

The maximum pressing force is determined by the shape and dimension of sintered material 11. The sizing device 1 can prevent the load exceeding the load bearing capacity of second thrust bearing 52 from acting on second thrust bearing 52.

On the other hand, the predetermined position in the retreating direction of the punch not supported by thrust bearing 50 changes according to the timing at which the punch supported by thrust bearing 50 and the punch not supported by thrust bearing 50 are respectively abutted on and stopped to first plate 71 and second plate 72.

For example, the case where the punch supported by thrust bearing 50 and the punch not supported by thrust bearing 50 are simultaneously abutted on and stopped at first plate 71 and second plate 72 is as follows. The predetermined position in the retreating direction of the punch not supported by thrust bearing 50 is a position of the punch not supported by thrust bearing 50 when the punch supported by thrust bearing 50 is abutted on and stopped at first plate 71. The case where the punch supported by thrust bearing 50 is abutted on and stopped at first plate 71 prior to the punch not supported by thrust bearing 50 is as follows. The predetermined position in the retreating direction of the punch not supported by thrust bearing 50 is a position closer onto the side of first punch 31 than the position of the punch not supported by thrust bearing 50 when the punch supported by thrust bearing 50 is abutted on and stopped at first plate 71. The case where the punch supported by thrust bearing 50 is abutted on and stopped at first plate 71 after the punch not supported by thrust bearing 50 is as follows. The predetermined position in the retreating direction of the punch not supported by thrust bearing 50 is a position closer onto the side of second punch 32 than the position of the punch not supported by thrust bearing 50 when the punch supported by thrust bearing 50 is abutted on and stopped at first plate 71.

In the first embodiment, first plate 71 abuts on and stops at first inner punch 311 through inner holder 40. First plate 71 abuts on the lower surface of overhang 412 of inner holder 40 to regulate the retraction of inner holder 40. The retraction of first inner punch 311 is regulated by the regulation of the retraction of inner holder 40. Accordingly, the load exceeding the load bearing capacity can be prevented from acting on thrust bearing 50, particularly second thrust bearing 52. Consequently, sizing device 1 can apply the high pressing force to sintered material 11. First plate 71 is located below overhang 412 of inner holder 40. First plate 71 is firmly fixed so as not to move downward even when abutting on overhang 412 of inner holder 40. The load bearing capacity of first plate 71 is higher than the load bearing capacity of thrust bearing 50, particularly second thrust bearing 52. The load bearing capacity of first plate 71 can be appropriately adjusted by the material of first plate 71. First plate 71 is made of a material having strength that is not deformed or broken even when the pressing force of second punch 32 is received.

Second plate 72 abuts on stops at first outer punch 312 through outer holder 45. Second plate 72 abuts on the lower surface of outer holder 45 to regulate the retraction of outer holder 45. The retraction of first outer punch 312 is regulated by the regulation of the retraction of outer holder 45. Accordingly, in sizing device 1, sintered material 11 can be uniformly pressed by first inner punch 311 and first outer punch 312. Second plate 72 is located below outer holder 45. Second plate 72 is firmly fixed so as not to move downward even when abutting on outer holder 45. Similarly to first plate 71, the load bearing capacity of second plate 72 is higher than the load bearing capacity of thrust bearing 50, particularly second thrust bearing 52. The load bearing capacity of second plate 72 can be appropriately adjusted by the material of second plate 72. Second plate 72 is made of the material having the strength that is not deformed or broken even when the pressing force of second punch 32 is received.

Effect

Sizing device 1 of the first embodiment can manufacture sintered material 10 having the excellent dimensional accuracy. In particular, the tooth profile error and the tooth trace error of the plurality of helical teeth 101 in sintered material 10 can be sufficiently reduced. By providing first plate 71 abutting on and stopping at first inner punch 311 at a predetermined position, even when the high pressing force is applied to sintered material 11 by second punch 32, the pressing force of second punch 32 acting on thrust bearing 50, particularly second thrust bearing 52, can be transmitted to first plate 71 through sintered material 11 and first inner punch 311. Accordingly, the load acting on thrust bearing 50 can be reduced and thus eliminated. Consequently, the pressing force higher than the load bearing capacity of thrust bearing 50 can be applied to sintered material 11.

[Method for Manufacturing Sintered Material]

Mainly with reference to FIGS. 3A to 3C, a method for manufacturing the sintered material of the first embodiment will be described. The method for manufacturing the sintered material of the first embodiment includes the processes of: preparing sintered material 11 having the plurality of helical teeth 111; disposing sintered material 11 in a predetermined cavity; and pressing sintered material 11 in the cavity by predetermined first punch 31 and predetermined second punch 32 to correct the dimension of sintered material 11. The method for manufacturing the sintered material of the first embodiment can manufacture sintered material 10 (FIG. 1) described above. In the method for manufacturing the sintered material of the first embodiment, sizing device 1 is used.

[Preparation of Sintered Material]

Prepared sintered material 11 includes the plurality of helical teeth 111 (FIG. 3A). The material, the shape, and the like of sintered material 11 are the same as those of sintered material 10 described above with reference to FIG. 1 except for the dimensional accuracy such as the tooth profile error and the tooth trace error. The preparation of sintered material 11 can be performed through, for example, a process of preparing a molded body having the plurality of helical teeth and a process of sintering a molded body having the plurality of helical teeth.

(Preparation of Molded Body)

The prepared molded body is obtained by pressure-molding a raw material powder containing a plurality of metal particles. The raw material powder can be appropriately selected so as to have a composition of sintered material 10. A known powder can be used as the raw material powder. In the pressure molding of the raw material powder, for example, a mold capable of performing near net shape finishing into a shape close to a finished product can be used. The molded body having the plurality of helical teeth on one of the inner peripheral surface and the outer peripheral surface is obtained by this pressure molding. A known condition can be applied as a molding condition. The preparation of the molded body having the plurality of helical teeth can also be performed by preparing the cylindrical molded body and forming the plurality of helical teeth on one of the inner peripheral surface and the outer peripheral surface of the cylindrical molded body by cutting. A known tool and a known condition can be applied as the cutting tool and the cutting condition.

(Sintering of Molded Body)

An appropriate sintering furnace can be used for the sintering of the molded body. The illustration of the sintering furnace is omitted. A known condition can be applied as a sintering condition.

[Disposition of Sintered Material into Cavity]

The cavity in which sintered material 11 is disposed is made of die 2 having through-hole 20, and core rod 30 and first punch 31 that are disposed in through-hole 20.

First, as illustrated in FIG. 3A, the upper surface of die 2 is aligned flush with the upper end surfaces of core rod 30, first inner punch 311, and first outer punch 312. At this point, a bush may be placed on the upper surface of die 2. The bush is not illustrated. The bush positions sintered material 11 with respect to die 2. The bush has a cylindrical shape. A through-hole corresponding to through-hole 20 of die 2 is provided at the center of the bush. The inner peripheral surface of the through-hole of the bush has a shape corresponding to the outer peripheral surface of sintered material 11. Consequently, the positioning of sintered material 11 and die 2 can be easily performed by disposing sintered material 11 inside the bush. Sintered material 11 is accommodated in the through-hole of the bush. By this accommodation, the lower end surface that is the first end surface of cylindrical portion 110 of sintered material 11 and the upper end surface of first outer punch 312 are brought into contact with each other.

Figure 3B:
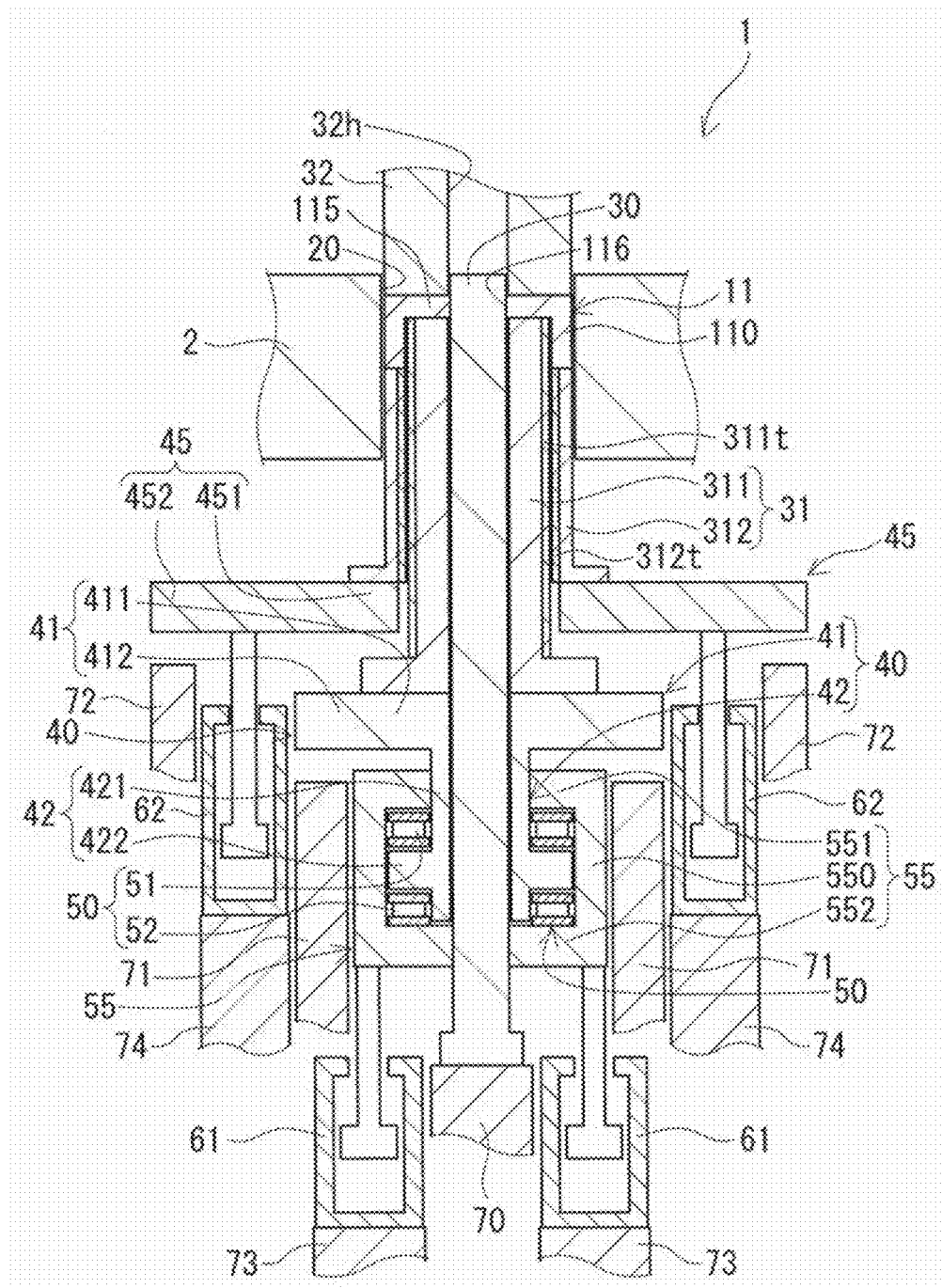
FIG. 3B is a sectional view schematically illustrating an outline of a state in which the sintered material is accommodated in the cavity in the sizing device of the first embodiment.
Figure 3C:
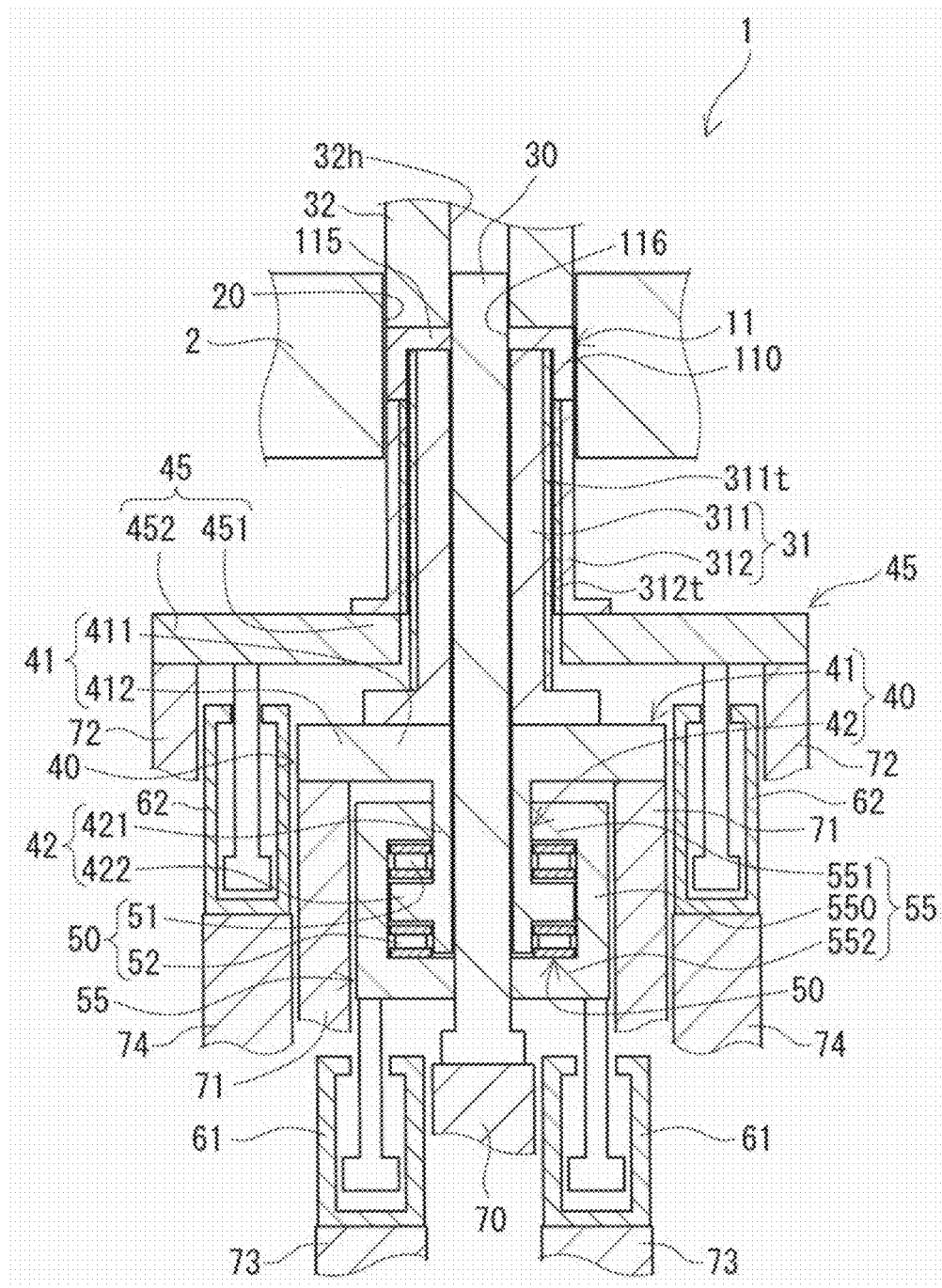
FIG. 3C is a sectional view schematically illustrating an outline of a state in which a first punch is retracted to a predetermined position in a retreating direction by pressing the sintered material in the sizing device of the first embodiment.

Subsequently, as illustrated in FIG. 3B, the upper surface that is the second surface of disk portion 115 of sintered material 11 is located below the upper surface of die 2 and the upper end surface of core rod 30. In addition, first helical teeth 311t of first inner punch 311 and helical teeth 111 on the inner peripheral surface of sintered material 11 are meshed with each other to bring the upper end surface of first inner punch 311 into contact with the lower surface that is the first surface of disk portion 115 of sintered material 11. In the first embodiment, as described later, first inner punch 311 is rotated without rotating first outer punch 312, die 2, and sintered material 11. First outer punch 312 and sintered material 11 may be rotated without rotating first inner punch 311 and die 2.

First, first inner punch 311 and first outer punch 312 are retracted by inner actuator 61 and outer actuator 62 (FIG. 3B). At this time, the upper end surface of first inner punch 311 is not in contact with the lower surface that is the first surface of disk portion 115 of sintered material 11. First inner punch 311 and first outer punch 312 are retracted until the upper end surface of first inner punch 311 is located below the upper surface of die 2. More specifically, as described later, when the upper end surface of first inner punch 311 and the first surface of disk portion 115 of sintered material 11 are brought into contact with each other, the contact is performed until the upper surface that is the second surface of disk portion 115 of sintered material 11 is located below the upper surface of die 2. Thus, the lower end surface of second punch 32 can be inserted into through-hole 20 of die 2.

Subsequently, second punch 32 is advanced to bring the lower end surface of second punch 32 into contact with the second end surface of cylindrical portion 110 of sintered material 11 and the second surface of disk portion 115. At this point, inner actuator 61 presses first inner punch 311 in the forward direction. the second helical tooth 312t of first outer punch 312 applies the force in the retreating direction to first helical tooth 31 it of first inner punch 311 by the pressing force of second punch 32 to sintered material 11.

First outer punch 312 is supported so as not to rotate, and first inner punch 311 is rotatably supported by thrust bearing 50. The pressing force acts on first inner punch 311 in the forward direction by inner actuator 61. Consequently, first inner punch 311 rotates while substantially maintaining its position by the force in the retreating direction with respect to first helical tooth 311t. That is, due to this rotation, first inner punch 311 does not substantially advance or retreat.

Due to the rotation of first inner punch 311, first outer punch 312 retreats without rotating. Sintered material 11 moves downward without rotating. When first inner punch 311 rotates to move down sintered material 11, helical teeth 111 of sintered material 11 mesh with first helical teeth 311t of first inner punch 311 over the entire length of helical teeth 111. Furthermore, the first surface of disk portion 115 of sintered material 11 and the upper end surface of first inner punch 311 come into contact with each other. Then, the lower end surface of second punch 32 and the second surface of disk portion 115 of sintered material 11 are located below the upper surface of die 2 and the upper end surface of core rod 30, and sintered material 11 is sandwiched between first punch 31 and second punch 32 in the cavity.

[Pressing Force of Sintered Material]

Sintered material 11 in the cavity is pressed by first punch 31 and second punch 32, thereby correcting the dimension of sintered material 11. Second punch 32 is further advanced to apply the pressing force to sintered material 11. First inner punch 311 and first outer punch 312 are retracted by the pressing force of second punch 32. As illustrated in FIG. 3C, when first inner punch 311 retreats to a predetermined position in the retreating direction, the lower surface of overhang 412 of inner holder 40 comes into contact with the upper surface of first plate 71, whereby first inner punch 311 is abutted and stopped. When first outer punch 312 retreats to a predetermined position in the retreating direction, overhang 452 of outer holder 45 coming into contact with the upper surface of second plate 72, whereby first outer punch 312 is abutted and stopped.

The predetermined position in the retreating direction of first inner punch 311 is a position satisfying both the following positions (1) and (2).

The position (1) is a position closer onto the side of second punch 32 than the position of first inner punch 311 where the maximum pressing force acts on sintered material 11.

The position (2) is a position where a load acting on thrust bearing 50 by second punch 32 falls within the range of the load bearing capacity of thrust bearing 50. In particular, the position (2) is a position where the load acting on second thrust bearing 52 falls within the range of the load bearing capacity of second thrust bearing 52.

As described above, the predetermined position of first outer punch 312 in the retreating direction changes according to the timing at which first inner punch 311 and first outer punch 312 are abutted on and stopped at first plate 71 and second plate 72, respectively. The abutment and stop of overhang 412 of inner holder 40 on and at first plate 71 and the abutment and stop of overhang 452 of outer holder 45 on and at second plate 72 are performed substantially simultaneously. As described above, the abutment and stop of overhang 412 of inner holder 40 on and at first plate 71 and the abutment and stop of overhang 452 of outer holder 45 on and at second plate 72 may not be performed at the same time but may have a time difference.

The abutment and stop enables the load acting on thrust bearing 50 to be transmitted to first plate 71. Accordingly, the load acting on thrust bearing 50, particularly second thrust bearing 52 can be reduced and thus eliminated. Consequently, the pressing force higher than the load bearing capacity of thrust bearing 50, particularly second thrust bearing 52 can be applied to sintered material 11 by first punch 31 and second punch 32. Accordingly, sintered material 10 having the excellent dimensional accuracy described with reference to FIG. 1 can be manufactured. That is, sintered material 10 including the plurality of helical teeth 101 in which the tooth profile error and the tooth trace error satisfy the above-described ranges can be manufactured. As illustrated in FIG. 2, sizing mark 102 is formed on at least a part of tooth bottom surface 101b, tooth surface 101s, and tooth tip surface 101t of helical tooth 101 of sintered material 10.

For example, the pressing force to the sintered material 11 can be set greater than or equal to 300 MPa. When the pressing force is greater than or equal to 300 MPa, the pressing force is sufficiently high, so that the dimensional accuracy of sintered material 11 is enhanced. When the pressing force is less than or equal to 900 MPa, because the pressing force is not too high, helical teeth 111 of sintered material 11 and sizing device 1 are prevented from being damaged.

Others

In the method for manufacturing the sintered material, sintered material 10 in which the dimension is corrected can be subjected to heat treatment. Examples of the heat treatment include quenching treatment and tempering treatment.

By quenching and tempering, the mechanical properties, particularly hardness and strength of sintered material 10 are improved. The quenching treatment may be a carburizing and quenching treatment. Known conditions can be applied to the quenching treatment, the carburizing and quenching treatment, and the tempering treatment.

Effect

The method for manufacturing the sintered material of the first embodiment can manufacture sintered material 10 having the excellent dimensional accuracy. In particular, sintered material 10 having the sufficiently small tooth profile error and tooth trace error of the plurality of helical teeth 101 can be manufactured. In the process of correcting the dimension of sintered material 11, first inner punch 311 can be abutted and stopped by first plate 71 at a predetermined position in the retreating direction. Accordingly, it is difficult for the pressing force of second punch 32 to act on thrust bearing 50, particularly second thrust bearing 52 through sintered material 11 and first inner punch 311, and thus, the pressing force of second punch 32 can be prevented from acting on second thrust bearing 52 at all. That is, the load acting on thrust bearing 50 can be reduced and thus eliminated. Consequently, the high pressing force can be applied to the sintered material 11.

Second Embodiment

[Sintered Material]

Figure 4:
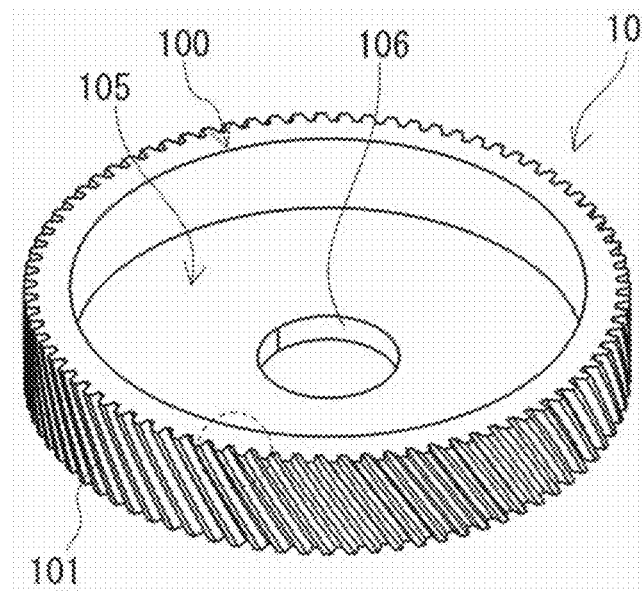
FIG. 4 is a perspective view schematically illustrating an outline of a sintered material according to a second embodiment.
Figure 5:
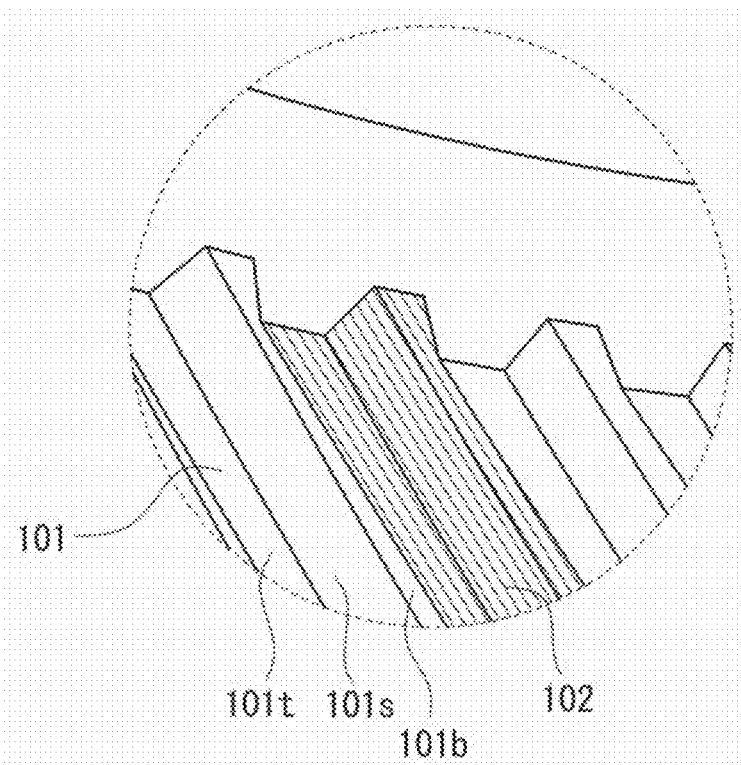
FIG. 5 is an enlarged view illustrating an outline of a peripheral surface of the sintered material according to the second embodiment.

With reference to FIGS. 4 to 5, a sintered material 10 according to a second embodiment will be described. FIG. 5 is an enlarged view illustrating a broken line circle in FIG. 4. Sintered material 10 of the second embodiment is different from sintered material 10 of the first embodiment in that the outer peripheral surface includes the plurality of helical teeth 101 and the plurality of sizing marks 102 and that the inner peripheral surface is a cylindrical surface. That is, the shape of the outer peripheral surface of sintered material 10 of the second embodiment is a helical gear shape. The shape of the inner peripheral surface of sintered material 10 of the second embodiment is a cylindrical shape. The tooth profile error and the tooth trace error of helical tooth 101 satisfy the same ranges as the tooth profile error and the tooth trace error in helical tooth 101 of sintered material 10 of the first embodiment. As in the first embodiment, sintered material 10 of the second embodiment has the small tooth profile error and the small tooth trace error of helical tooth 101, and is excellent in dimensional accuracy.

[Sizing Device]

Figure 6:
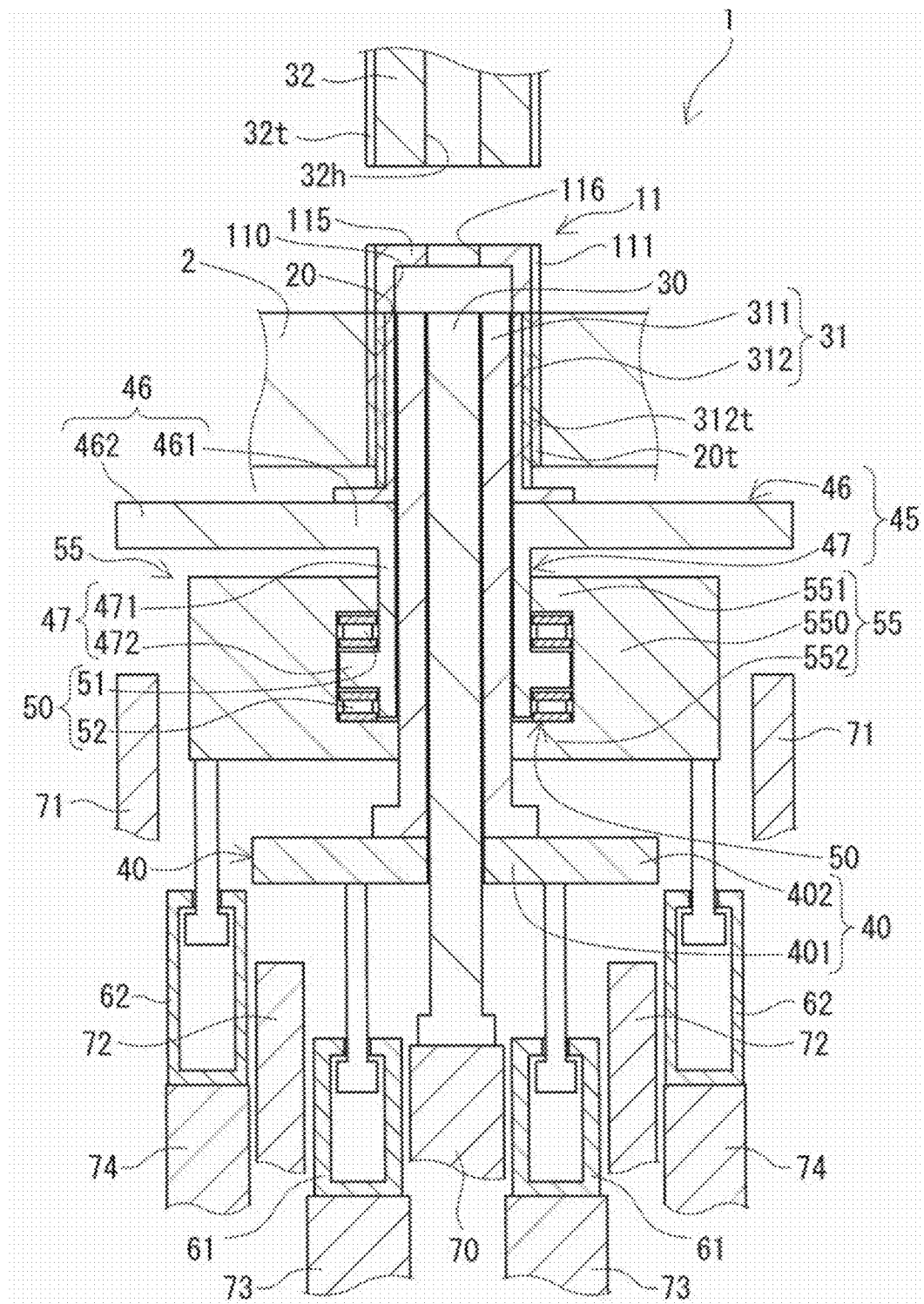
FIG. 6 is a sectional view schematically illustrating an outline of a state before a sintered material is accommodated in a cavity in a sizing device of the second embodiment.

With reference to FIG. 6, a sizing device 1 of the second embodiment will be described. Sizing device 1 of the second embodiment is different from sizing device 1 of the first embodiment in the inner peripheral surface of through-hole 20 of die 2, the outer peripheral surface of first inner punch 311, the inner peripheral surface and the outer peripheral surface of first outer punch 312, the outer peripheral surface of second punch 32, and the member rotatably supported by thrust bearing 50. The following description will focus on differences from sizing device 1 of the first embodiment. The description of the same configuration as that of sizing device 1 of the first embodiment will be omitted.

Although not illustrated, second punch 32 is rotatably supported by the same configuration as first outer punch 312.

[Shapes of Inner Peripheral Surface and Outer Peripheral Surface of Each Member]

The inner peripheral surface of through-hole 20 includes a plurality of first helical teeth 20*t* that mesh with the plurality of helical teeth 111 of sintered material 11. The inner peripheral surface and the outer peripheral surface of first inner punch 311 are constituted of cylindrical surfaces. The inner peripheral surface of first outer punch 312 is constituted of a cylindrical surface. The outer peripheral surface of first outer punch 312 has the plurality of second helical teeth 312*t* that mesh with the plurality of first helical teeth 20*t*. The outer peripheral surface of second punch 32 has a plurality of helical teeth 32*t* that mesh with the plurality of first helical teeth 20*t*.

[Support Form]

First outer punch 312 is rotatably supported by thrust bearing 50 through outer holder 45. First inner punch 311 is held by inner holder 40 so as not to rotate.

[Inner Holder and Outer Holder]

The configurations of inner holder 40 and outer holder 45 are opposite to those in the first embodiment. Inner holder 40 is not attached to thrust bearing 50. For this reason, first inner punch 311 does not rotate. Inner holder 40 has a cylindrical shape. An insertion hole through which core rod 30 is inserted is formed at the center of inner holder 40. The inner peripheral shape of the insertion hole has a shape corresponding to the outer shape of core rod 30. In the second embodiment, the inner peripheral shape of the insertion hole has a cylindrical shape.

Inner holder 40 includes a body 401 and an overhang 402. Body 401 holds first inner punch 311. Overhang 402 is abutted on and stopped at second plate 72 described later at a predetermined position in the retreating direction during the sizing of sintered material 11. When being located at a position on the advancing direction side with respect to a predetermined position in the retreating direction, overhang 402 is not abutted on and stopped at second plate 72. The timing of abutting and stopping overhang 402 of inner holder 40 on and at second plate 72 may be substantially the same time or not the same time as the timing of abutting and stopping overhang 462 of outer holder 45 on and at first plate 71, or be earlier or later than the timing of abutting and stopping overhang 462 of outer holder 45 on and at first plate 71. Overhang 402 is provided on the outer peripheral side of body 401.

Outer holder 45 is attached to thrust bearing 50 accommodated in bearing case 55. Consequently, first outer punch 312 is rotatably supported by thrust bearing 50 through outer holder 45. Outer holder 45 has a cylindrical shape. The insertion hole through which first inner punch 311 and core rod 30 are inserted is formed at the center of outer holder 45. The inner peripheral shape of the insertion hole is a shape corresponding to the outer shape of first inner punch 311. In the second embodiment, the inner peripheral shape of the insertion hole has a cylindrical shape.

In the second embodiment, outer holder 45 includes a first outer holder 46 and a second outer holder 47. First outer holder 46 is provided on the side of first outer punch 312. Second outer holder 47 is provided on the side opposite to the side of first outer punch 312 of first outer holder 46. First outer holder 46 and second outer holder 47 may be formed in series, or be formed independently and connected to each other.

First outer holder 46 includes a first body 461 and an overhang 462. First body 461 is provided on the side of first inner punch 311 and holds first outer punch 312. Overhang 462 is abutted on and stopped at first plate 71 described later at a predetermined position in the retreating direction during the sizing of sintered material 11. When being located at a position on the advancing direction side with respect to a predetermined position in the retreating direction, overhang 462 is not abutted on and stopped at first plate 71. Overhang 462 is provided on the outer peripheral side of first body 461.

Second outer holder 47 is accommodated in bearing case 55. Second outer holder 47 includes a second body 471 and a flange 472. Second body 471 is provided on the side of core rod 30, and is mounted inside first thrust bearing 51 and second thrust bearing 52. Flange 472 is formed in an annular shape protruding from the outer peripheral surface of second body 471 toward the outer peripheral side. Flange 472 is interposed between first thrust bearing 51 and second thrust bearing 52.

[Thrust Bearing]

In the second embodiment, thrust bearing 50 rotatably supports first outer punch 312. Similarly to the first embodiment, thrust bearing 50 includes two bearings of first thrust bearing 51 and second thrust bearing 52. Both thrust bearings 51, 52 are accommodated in bearing case 55. Both thrust bearings 51, 52 are mounted on the outer periphery of second body 471 in outer holder 45 so as to sandwich flange 472 of outer holder 45 from both sides in the axial direction of second body 471. Similarly to the first embodiment, a thrust roller bearing can be used as both thrust bearings 51, 52.

[Bearing Case]

Bearing case 55 is similar to bearing case 55 of the first embodiment. First annular portion 551 of bearing case 55 is disposed above first thrust bearing 51, and sandwiches first thrust bearing 51 between first annular portion 551 and flange 472. The insertion hole through which second body 471 of second outer holder 47 is inserted is provided at the center of first annular portion 551. Second annular portion 552 of bearing case 55 is disposed below second thrust bearing 52, and sandwiches second thrust bearing 52 between second annular portion 552 and flange 472.

[Inner Actuator and Outer Actuator]

Inner actuator 61 is connected to inner holder 40 in the second embodiment. First inner punch 311 lifts and lowers without rotating by inner actuator 61 lifting and lowering inner holder 40. Outer actuator 62 is connected to bearing case 55 in the second embodiment. When bearing case 55 is lifted or lowered by outer actuator 62, second helical teeth 312t of first outer punch 312 apply the upward force or the downward force to first helical teeth 20t of die 2 through outer holder 45. First outer punch 312 lifts and lowers while rotating with respect to die 2 and first inner punch 311 by the upward force or the downward force.

[First Plate and Second Plate]

In the second embodiment, first plate 71 abuts on and stops at first outer punch 312 through outer holder 45. First plate 71 abuts on the lower surface of overhang 462 of outer holder 45 to regulate the retraction of outer holder 45. The retraction of first outer punch 312 is regulated by the regulation of the retraction of outer holder 45. First plate 71 is located below overhang 462 of outer holder 45. First plate 71 is fixed so as not to move downward even when coming into contact with overhang 462 of outer holder 45. The load bearing capacity of first plate 71 is higher than the load bearing capacity of thrust bearing 50, particularly second thrust bearing 52.

Second plate 72 abuts on stops at first inner punch 311 through inner holder 40. Second plate 72 abuts on the lower surface of inner holder 40 to regulate the retraction of inner holder 40. The retraction of first inner punch 311 is regulated by the regulation of the retraction of inner holder 40. Second plate 72 is located below overhang 402 of inner holder 40. Second plate 72 is fixed so as not to move downward even when abutting on inner holder 40. Similarly to first plate 71, the load bearing capacity of second plate 72 is higher than the load bearing capacity of thrust bearing 50, specifically, second thrust bearing 52.

Effect

Similarly to sizing device 1 of the first embodiment, sizing device 1 of the second embodiment can manufacture sintered material 10 having the excellent dimensional accuracy.

[Method for Manufacturing Sintered Material]

The method for manufacturing the sintered material of the second embodiment includes the same processes as in the first embodiment. The method for manufacturing the sintered material of the second embodiment is different from that of the first embodiment in behavior of first inner punch 311, first outer punch 312, and sintered material 11 in the process of disposing sintered material 11 in the cavity.

[Disposition of Sintered Material into Cavity]

When the upper surface of die 2 is flush with the upper end surfaces of core rod 30, first inner punch 311, and first outer punch 312, similarly to the first embodiment, the upper surface that is the second surface of disk portion 115 of sintered material 11 is located so as to be below the upper surface of die 2 and the upper end surface of core rod 30. In addition, first helical teeth 20t of die 2 and helical teeth 111 of the outer peripheral surface of sintered material 11 are meshed with each other to bring the upper end surface of first inner punch 311 into contact with the lower surface that is the first surface of disk portion 115 of sintered material 11. In the second embodiment, as described later, first outer punch 312 and sintered material 11 are rotated without rotating first inner punch 311 and die 2.

Second punch 32 is advanced to bring the lower end surface of second punch 32 into contact with the second end surface of cylindrical portion 110 of sintered material 11 and the second surface of disk portion 115. The pressing force is applied to sintered material 11 by second punch 32. Second helical teeth 312t of first outer punch 312 mesh with first helical teeth 20t of die 2. First outer punch 312 is rotatably supported by thrust bearing 50. Accordingly, first outer punch 312 retreats while rotating by the pressing force of second punch 32 to sintered material 11. When first outer punch 312 is retracted, helical teeth 111 of sintered material 11 mesh with first helical teeth 20t of die 2. When first outer punch 312 further retreats, sintered material 11 advances to the inside of through-hole 20 of die 2 while rotating. As second punch 32 advances, helical teeth 32t of second punch 32 mesh with first helical teeth 20t of die 2. Helical teeth 32t of second punch 32 mesh with first helical teeth 20t of die 2, whereby second punch 32 advances while rotating. The forward movement of second punch 32, the backward movement and rotation of first outer punch 312, and the rotation and movement of sintered material 11 are performed until the following states (1) and (2) are satisfied. The state (1) is a state in which helical teeth 111 of sintered material 11 mesh with first helical teeth 20t of die 2 over the entire length of helical teeth 111. The state (2) is a state in which the lower end surface of second punch 32 and the second surface of disk portion 115 of sintered material 11 are located below the upper surface of die 2 and the upper end surface of core rod 30. At this point, sintered material 11 is sandwiched between first punch 31 and second punch 32 in the cavity.

[Pressing Force of Sintered Material]

Second punch 32 is further advanced to apply the pressing force to sintered material 11, thereby correcting the dimension of sintered material 11. First inner punch 311 and first outer punch 312 are retracted by the pressing force of second punch 32. When first outer punch 312 retreats to a predetermined position in the retreating direction, overhang 462 of first outer holder 46 comes into contact with the upper surface of first plate 71, whereby first outer punch 312 is abutted and stopped. When first inner punch 311 retreats to a predetermined position in the retreating direction, the lower surface of overhang 402 of inner holder 40 comes into contact with the upper surface of second plate 72, whereby the first inner punch 311 is abutted and stopped.

The predetermined position in the retreating direction of first outer punch 312 is a position that satisfies both of the following positions (1) and (2) similarly to the predetermined position in the retreating direction of first inner punch 311 in the first embodiment. The position (1) is a position closer onto the side of second punch 32 than the position of the first outer punch 312 where the maximum pressing force acts on sintered material 11.

The position (2) is the same as the position (2) described in the first embodiment.

The predetermined position of first inner punch 311 in the retreating direction changes according to the timing at which first outer punch 312 and first inner punch 311 are abutted on and stooped at first plate 71 and second plate 72, respectively. The abutment and stop of overhang 402 of inner holder 40 on and at second plate 72 and the abutment and stop of overhang 462 of outer holder 45 on and at first plate 71 are performed substantially simultaneously. As described above, the abutment and stop of overhang 402 of inner holder 40 on and at second plate 72 and the abutment and stop of overhang 462 of outer holder 45 on and at first plate 71 may not be performed at the same time but may have a time difference.

Effect

The method for manufacturing the sintered material of the second embodiment can manufacture sintered material 10 having the excellent dimensional accuracy similarly to the method for manufacturing the sintered material of the first embodiment.

Test Example 1

The dimensions of the sintered material were corrected using the sizing device, and the dimensional accuracy was examined.

[Sample No. 1]

The sintered material of sample No. 1 was prepared using sizing device 1 of the first embodiment described with reference to FIGS. 3A to 3C through the following processes S1 to S3 in order.

[Process S1] In process S1, the sintered material including the plurality of helical teeth is prepared.

[Process S2] In process S2, the sintered material is disposed in the cavity formed by die 2, core rod 30, first inner punch 311, and first outer punch 312 of sizing device 1.

[Process S3] In process S3 presses the sintered material in the cavity to correct the dimension of the sintered material.

[Process S1]

The preparation of the sintered material before the sizing is performed through the following processes S11 to S13 in order.

In process S11, the raw material powder is prepared.

In process S12, the molded body including the plurality of helical teeth is produced.

In process S13, the molded body including the plurality of helical teeth is sintered.

(Process S11)

A mixed powder containing an Fe powder, an Ni powder, an Mo powder, a Cu powder, and a C powder was prepared as the raw material powder. An average particle size of the Fe powder is 65 µm, an average particle size of the Ni powder is 10 µm, an average particle size of the Mo powder is 10 µm, an average particle size of the Cu powder is 22 µm, and an average particle size of the C powder is 18 µm. The average particle size is a particle size at which a cumulative volume in a volume particle size distribution measured by a laser diffraction particle size distribution measuring device is 50%. As to the content of each powder, the content of the Ni powder was 4 mass %, the content of the Mo powder was 0.5 mass %, the content of the Cu powder was 1.5 mass %, the content of the C powder was 0.5 mass/o, and the content of the Fe powder was the balance.

(Process S12)

The mold capable of near-net shape finishing into a shape close to a finished product was used for the production of the molded body. The raw material powder was filled in the mold, and pressure-molded to prepare the molded body. The molded body includes a cylindrical portion and a disk portion provided on one end side of the cylindrical portion. The inner peripheral surface of the cylindrical portion includes the plurality of helical teeth in FIG. 1. The outer peripheral surface of the cylindrical portion of the molded body is a cylindrical surface. The cylindrical through-hole is provided at the center of the disk portion.

(Process S13)

The molded body subjected to cutting processing was sintered to prepare the sintered material. After the sintering time elapsed, the sintered material was slowly cooled to room temperature.

[Process S2]

The sintered material was disposed in the cavity as follows. First, as described above with reference to FIG. 3A, the upper surface of die 2 is flush with the upper end surfaces of core rod 30, first inner punch 311, and first outer punch 312. Then, the sintered material was placed such that the end surface of the cylindrical portion of the sintered material was in contact with the upper end surface of first outer punch 312.

Subsequently, as described above with reference to FIG. 3B, first inner punch 311 and first outer punch 312 were retracted such that the upper surface that is the second surface of disk portion 115 of sintered material 11 was located below the upper surface of die 2 and the upper end surface of core rod 30. In addition, first inner punch 311 was rotated without rotating first outer punch 312, die 2, and sintered material 11 to bring the upper end surface of first inner punch 311 into contact with the lower surface that is the first surface of disk portion 115 of sintered material 11, and first helical tooth 311t of first inner punch 311 and helical tooth 111 of the inner peripheral surface of sintered material 11 were meshed with each other.

[Process S3]

The sintered material was pressed by first inner punch 311, first outer punch 312, and second punch 32. At this point, as described with reference to FIG. 3C, first inner punch 311 was abutted on and stopped at first plate 71 at a predetermined position in the retreating direction, and first outer punch 312 is abutted on and stopped at second plate 72 at a predetermined position in the retreating direction. Accordingly, the pressing force was increased greater than or equal to 300 MPa.

[Sample No. 101]

The dimension of the sintered material of sample No. 101 was corrected in the same manner as in sample No. 1 except that first plate 71 and second plate 72 were not provided in sizing device 1 used in sample No. 1 and that the pressing force in process S3 was reduced. The pressing force was set less than or equal to 100 MPa from the relationship of the load bearing capacity of thrust bearing 50. Because first plate 71 is not provided, the pressing force of second punch 32 acts on thrust bearing 50. Accordingly, the pressing force in process S3 was much smaller than that of sample No. 1. That is, the pressing force higher than that of sample No. 1 could not be applied to the sintered material of sample No. 101.

[Evaluation of Dimensional Accuracy]

The dimensional accuracy of the sintered material after the sizing was evaluated by obtaining the tooth profile error and the tooth trace error of the helical tooth. In this case, in eight helical teeth, the tooth profile error and the tooth trace error of the left and right tooth surfaces of each helical tooth were obtained. The eight helical teeth were as follows. Any one helical tooth was used as a reference tooth. Teeth at positions that included the reference tooth and were roughly equally divided into eight in the circumferential direction were used. That is, when the helical teeth are viewed in planar view from the first surface side of the disk portion, assuming that the reference tooth is a first tooth around the torsion direction of the helical teeth, a twelfth tooth from the reference tooth is a second tooth, a twenty-second tooth is a third tooth, a thirty-second tooth is a fourth tooth, a forty-second tooth is a fifth tooth, a fifty-third tooth is a sixth tooth, a sixty-third teeth is a seventh tooth, and a seventy-third tooth are an eighth tooth. The first surface side of the disk portion is the upper side of the paper surface in FIG. 1. The rotation of the helical teeth in the twist direction is the rotation in the right direction in the case of the right twist. The tooth profile error and the tooth trace error on the left and right tooth surfaces of each tooth were obtained according to "JIS B 1702-1 (2016) cylindrical gears-precision grades—part 1: definitions and allowable values of errors in gear teeth surface". The tooth profile error and the tooth trace error correspond to the "all tooth type error" and the "all tooth trace error" in JIS. The tooth surface on the right side of each tooth is a tooth surface located on the right side in the clockwise direction. The tooth surface on the left side of each tooth is a tooth surface opposite to the tooth surface on the right side.

In the sintered material of sample No. 1, the maximum tooth profile error on the right tooth surface of the first to eighth teeth was 5 µm. The maximum tooth profile error on the tooth surface on the left side of the first to eighth teeth was 4 µm. Furthermore, the maximum tooth trace error on the right tooth surface of the first to eighth teeth was 27 µm. The maximum tooth trace error on the tooth surface on the left side of the first to eighth teeth was 14 µm.

On the other hand, in the sintered material of sample No. 101, the maximum tooth profile error on the right tooth surface of the first to eighth teeth was 11 µm. The maximum tooth profile error on the tooth surface on the left side of the first to eighth teeth was 8 µm. Furthermore, the maximum tooth trace error on the right tooth surface of the first to eighth teeth was 46 µm. The maximum tooth trace error on the tooth surface on the left side of the first to eighth teeth was 28 µm.

From the above results, it has been found that the sintered material having the excellent dimensional accuracy can be obtained using sizing device 1 including first plate 71 that abuts and stops first inner punch 311 at a predetermined position in the retreating direction of first inner punch 311. In addition, it has been found that, in the process of correcting the dimension of the sintered material, first inner punch 311 is abutted and stopped at a predetermined position in the retreating direction of first inner punch 311, whereby the sintered material having the excellent dimensional accuracy is obtained.

The present invention is not limited to these examples, but is indicated by the claims, and is intended to include meanings equivalent to the claims and all modifications within the scope.

REFERENCE SIGNS LIST 10, 11: sintered material
  100, 110: cylindrical portion
    101, 111: helical tooth
      101b: tooth bottom surface
      101s: tooth surface
      110t: tooth tip surface
    102: sizing mark
  105, 115: disk portion
    106, 116: through-hole
1: sizing device
2: die
  20: through-hole
  20t: first helical tooth
30: core rod
31: first punch
  311: first inner punch
    311t: first helical tooth
  312: first outer punch
    312t: second helical tooth
32: second punch
  32h: insertion hole
  32t: helical tooth
40: inner holder
  401: body
  402: overhang
  41: first inner holder
    411: first body
    412: overhang
  42: second inner holder
    421: second body
    422: flange
45: outer holder
  451: body
  452: overhang
  46: first outer holder
    461: first body
    462: overhang
  47: second outer holder
    471: second body
    472: flange
50: thrust bearing
  51: first thrust bearing
  52: second thrust bearing 55: bearing case
  550: outer peripheral wall
  551: first annular portion
  552: second annular portion,
61: inner actuator
62: outer actuator,
70: core plate
71: first plate
72: second plate
73: inner plate
74: outer plate

The invention claimed is:

1. A sizing device that corrects a dimension of a sintered material including a plurality of helical teeth, the sizing device comprising:
   a die provided with a through-hole in which the sintered material is disposed;
   a first punch and a second punch that are disposed opposite to each other in the through-hole, the first punch and the second punch being configured to press the sintered material therebetween;
   a thrust bearing that rotatably supports the first punch; and
   a first plate that abuts and stops the first punch at a predetermined position in a retreating direction of the first punch,
   wherein one of an inner peripheral surface of the through-hole of the die and an outer peripheral surface of the first punch has a plurality of first helical teeth that meshes with the plurality of helical teeth of the sintered material, and
   the predetermined position is a position where a load acting on the thrust bearing is less than or equal to a load bearing capacity of the thrust bearing.

2. The sizing device according to claim 1, wherein:
   the first punch includes a first inner punch and a first outer punch disposed inside and outside the through-hole,
   the thrust bearing rotatably supports one of the first inner punch and the first outer punch,
   the first plate abuts and stops one of the first inner punch and the first outer punch supported by the thrust bearing at the predetermined position in a retreating direction of the first punch,
   the plurality of first helical teeth is provided on one of the inner peripheral surface of the through-hole of the die and the outer peripheral surface of the first inner punch, and
   one of an inner peripheral surface and an outer peripheral surface of the first outer punch includes a plurality of second helical teeth that meshes with the plurality of first helical teeth.

3. The sizing device according to claim 2, further comprising:
   an inner holder that holds the first inner punch;
   an inner actuator that lifts and lowers the inner holder;
   an outer holder that holds the first outer punch;
   an outer actuator that lifts and lowers the outer holder, and
   a second plate that abuts and stops another of the first inner punch and the first outer punch, which is not supported by the thrust bearing, at the predetermined position in the retreating direction of the punch,
   wherein the thrust bearing includes a first thrust bearing and a second thrust bearing disposed opposite to each other along an axial direction of the inner holder, and
   the inner holder includes:
   a body mounted on insides of the first thrust bearing and the second thrust bearing;
   a flange interposed between the first thrust bearing and the second thrust bearing; and
   an overhang provided on a second punch side with respect to the flange and abutted on and stopped at the first plate.

4. The sizing device according to claim 3, wherein:
   the outer peripheral surface of the first inner punch includes the plurality of first helical teeth, and
   the inner peripheral surface of the first outer punch includes the plurality of second helical teeth.

5. The sizing device according to claim 2, further comprising:
   an inner holder that holds the first inner punch;
   an inner actuator that lifts and lowers the inner holder;
   an outer holder that holds the first outer punch;
   an outer actuator that lifts and lowers the outer holder, and
   a second plate that abuts and stops another of the first inner punch and the first outer punch, which is not supported by the thrust bearing, at the predetermined position in the retreating direction of the punch,
   wherein the thrust bearing includes a first thrust bearing and a second thrust bearing disposed opposite to each other along an axial direction of the outer holder, and
   the outer holder includes:
   a body mounted on insides of the first thrust bearing and the second thrust bearing;
   a flange interposed between the first thrust bearing and the second thrust bearing; and
   an overhang provided on a second punch side with respect to the flange and abutted on and stopped at the first plate.

6. The sizing device according to claim 5, wherein:
   the inner peripheral surface of the through-hole of the die includes the plurality of first helical teeth, and
   the outer peripheral surface of the first outer punch includes the plurality of second helical teeth.

* * * * *